UNITED STATES PATENT OFFICE.

WILLIAM H. ALLEN, OF DETROIT, MICHIGAN.

ICE-CREAM OR WATER-ICE.

SPECIFICATION forming part of Letters Patent No. 468,631, dated February 9, 1892.

Application filed March 25, 1891. Serial No. 386,387. (No specimens.)

*To all whom it may concern:*

Be it known that I, WILLIAM H. ALLEN, a citizen of the United States, residing at Detroit, in the county of Wayne and State of Michigan, have invented certain new and useful Improvements in Ice-Cream or Water-Ices, of which the following is a specification.

This invention relates to new and useful improvements in ice-cream or water-ices; and the invention consists in the hereinafter-described edible frozen material containing an effervescent compound which is held inactive in the ice at its normal temperature, but which when heated by being placed in the mouth to be eaten will be liberated. To manufacture these ices I can proceed in several ways. The one which I preferably employ in the manufacture of a small amount of such ice is to incorporate into the ice after it is frozen a mixture of citric or other suitable acid with bicarbonate of soda or other carbonate or bicarbonate, with about equal quantities of each in proper proportion to give the desired effervescent effect. This compound may be employed to the amount of an ounce to every quart of ice-cream, more or less, as may be deemed desirable by the manufacturer. The effervescent effect or chemical action of these parts will be retarded until the ice retaining them is put in the mouth, and as soon as the ice melts they will effervesce and cause the usual pleasant effect to the palate of such compounds.

An acid such as citric acid and a carbonate such as soda cannot exist as such in water together. If the water is frozen, as in my improved ice-cream and water-ices, and these materials are then added, the chemical action is retarded until the ice is melted. Then the reaction takes place and the gas is formed and liberated.

I have found by experiment that the flat taste of water-ice is very largely destroyed by the use of such an effervescent compound and the flavor greatly improved, producing a much more palatable article.

What I claim as my invention is—

1. An edible ice containing a carbonate and an acid, substantially as described.

2. An edible ice containing a composition of citric acid and bicarbonate of soda, substantially as described.

In testimony whereof I affix my signature in presence of two witnesses.

WILLIAM H. ALLEN.

Witnesses:
M. B. O'DOGHERTY,
P. M. HULBERT.